Feb. 13, 1951                    E. H. MILLER                    2,541,775
                                SOLDER SPRAY GUN
Filed March 22, 1948                                          2 Sheets-Sheet 1
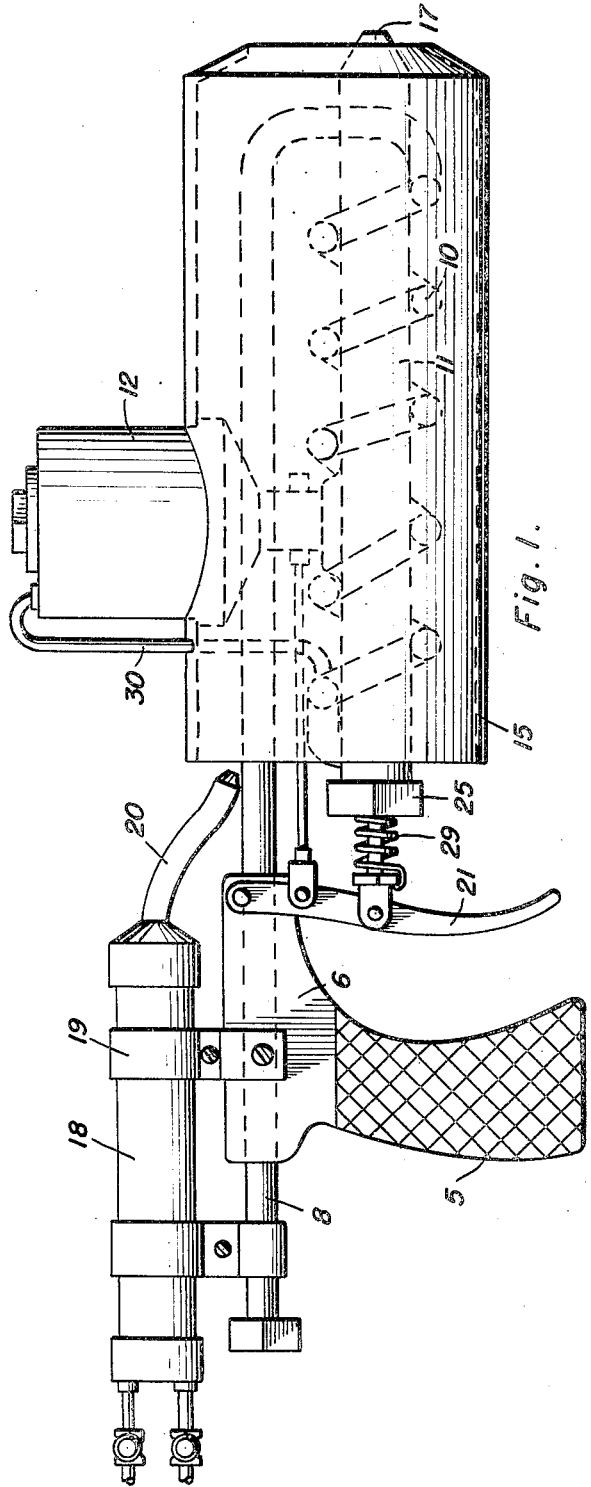
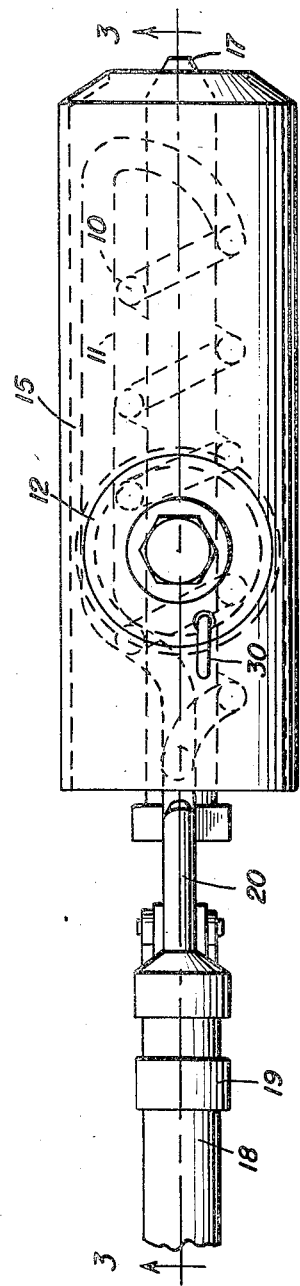
Eugene H. Miller
    INVENTOR.

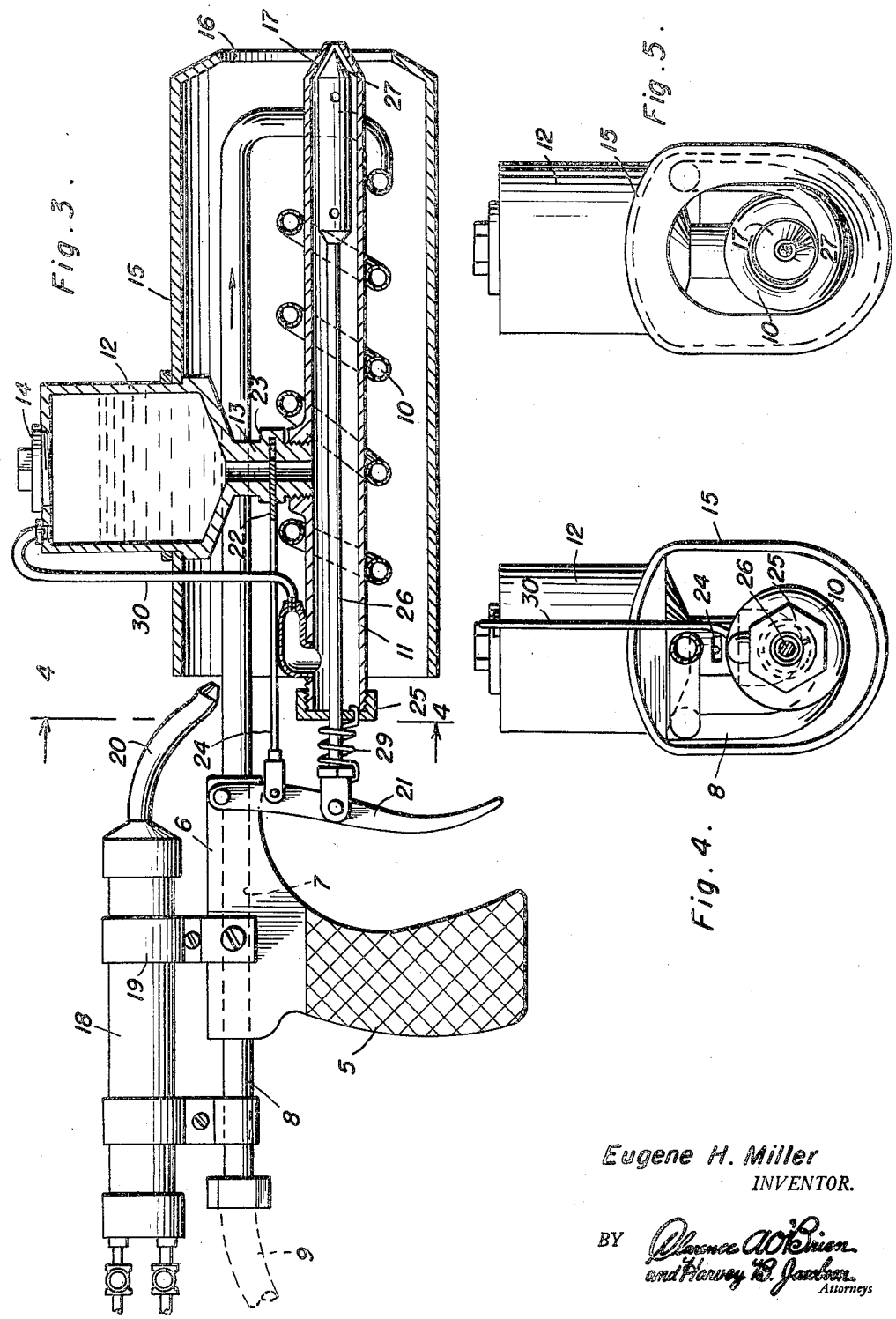

Patented Feb. 13, 1951

2,541,775

UNITED STATES PATENT OFFICE 2,541,775

SOLDER SPRAY GUN

Eugene H. Miller, Louisville, Ky.

Application March 22, 1948, Serial No. 16,272

4 Claims. (Cl. 91—12.2)

The present invention relates to new and useful improvements in spray guns and more particularly to a solder spray gun.

An important object of the invention is to provide a solder spray gun for building up the surface of damaged automobile bodies and fenders where the filing or smoothing of the damaged surface would reduce the thickness of the metal to an extent which would weaken the same, and it is accordingly the usual practice to build up the thickness of the metal before the filing, sanding or smoothing operations whereby to retain the strength of the finished work.

It is, therefore, an object of the present invention to provide a solder spray gun for spraying thin coats of solder on the damaged surface in a quick and effective manner and under the control of the operator.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view;

Figure 2 is a top plan view;

Figure 3 is an enlarged longitudinal sectional view taken substantially on the line 3—3 of Figure 2;

Figure 4 is a transverse sectional view taken substantially on the line 4—4 of Figure 3; and, Figure 5 is a front elevational view.

Referring now to the drawings in detail wherein for the purpose of illustration I have disclosed a preferred embodiment of the invention, the numeral 5 designates a handle of pistol grip form and of suitable heat insulation material and having an elongated stock 6 at its upper portion formed with a longitudinally extending bore 7.

An air pipe 8 is suitably secured in the bore 7 with an air hose 9 attached to its rear end leading to a suitable source of compressed air.

The front end of the tube or pipe 8 is bent downwardly and formed with a rearwardly extending coil 10 and connected at its rear end to a longitudinally extending barrel 11, the pipe 8 and coil 10 being constructed of sufficiently rigid material to support the barrel axially of the coil.

A solder reservoir 12 is formed at its bottom with a discharge neck 13 connected to an intermediate portion of the barrel 11, the reservoir having a filler plug 14.

The lower portion of the reservoir 12, including the neck 13, and the barrel 11, pipe 8 and coil 10 are enclosed in a cylindrical shield 15 which is fully opened at its rear end and formed with a reduced opening 16 at its front end and in which a nozzle 17 formed at the front end of barrel 11 is positioned.

An acetylene torch 18 of a conventional type is supported on the stock 6 and rear end of pipe 8 by clamping brackets 19. The torch having a nozzle 20 at its front end which is inclined downwardly for directing a flame from the torch onto the pipe 8 at the rear end of shield 15, the flame being directed forwardly in the shield and partially pocketed therein to heat the bottom of the reservoir 12 as well as the front end of pipe 8, coil 10 and barrel 11 so that solder contained in the reservoir will be melted and fed to the barrel 11 through neck 13.

A trigger 21 is pivoted at its upper end to the stock 6 and extends downwardly in front of the handle 5 for forwardly and rearwardly swinging movement and a slide valve 22 is slidably positioned transversely of neck 13 and formed with an opening 23 to register with the neck to regulate the discharge of solder into the barrel 11. The slide valve 22 is connected to the trigger by means of a link 24.

A cap 25 is threaded on the rear end of barrel 11 and in which a rod 26 is slidable with the rear end attached to trigger 21 and having a plug type tapered cut-off valve 27 at its front end working in guide 28 in the barrel and movable into and out of position for closing the discharge end of nozzle 17. A coil spring 29 on the rear end of rod 26 between cap 25 and trigger 21 holds the valve 27 in closed position and is opened by a rearward movement of the trigger.

A pressure equalizing tube 30 leads from the rear end of coil 10 to the top of reservoir 12.

In the operation of the device compressed air is supplied to pipe 8 from a suitable source (not shown) and the flame from torch 18 heats the pipe so that when the air enters barrel 11 the same is heated to a desired temperature. The heat from the torch also heats the lower end of reservoir 12 to melt the solder therein and which is then fed to barrel 11 under control of valve 22 for discharge from the nozzle onto the work.

The trigger 21 controls both valve 22 and nozzle 17 to simultaneously open the valves.

The tube 30 supplies the upper portion of reservoir 12 with heated air under pressure to force the solder downwardly into barrel 11.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A metalizing spray gun comprising a tubular shield open at each end, a spray barrel positioned longitudinally in the shield and having a nozzle at its front end substantially centered in and spaced from the walls at the open front end of the shield, a tube entering the rear end of the shield and extending forwardly therein substantially throughout the length of the shield and having a return bend at its front portion to reverse the direction of the tube for connecting to the rear end of the barrel for feeding air under pressure to the barrel, a reservoir having a discharge connected to the barrel, and means at the rear end of the shield for directing a fluid heating medium into the rear end of the shield for circulation therethrough.

2. A metalizing spray gun comprising a tubular shield open at each end, a spray barrel positioned longitudinally in the shield and having a nozzle at its front end substantially centered in and spaced from the walls at the open front end of the shield, a tube entering the rear end of the shield and extending forwardly therein substantially throughout the length of the shield and having a return bend at its front portion to reverse the direction of the tube for connecting to the rear end of the barrel for feeding air under pressure to the barrel, a reservoir having a discharge connected to the barrel, and means at the rear end of the shield for directing a jet of fluid heating medium against the incoming end of the air tube and also against the contents of the reservoir.

3. A spray gun comprising in combination, a handle, an air tube supported by the handle and having a coil formed therein, a barrel supported axially of the coil and having a nozzle at its outer end, said coil being connected to the rear end of the barrel, a reservoir having its discharge end connected to the barrel and supported thereon, a shield supported by the reservoir and enclosing the barrel and also enclosing the coil and at least the discharge end of the reservoir, a blow torch carried by the handle and arranged for feeding heated gases to the rear end of the shield, individual valves for the discharge end of the reservoir and for the nozzle of the barrel, and a single trigger operating means for both of the valves.

4. A spray gun comprising in combination, a handle, an air tube supported by the handle and having a coil formed therein, a barrel supported axially of the coil and having a nozzle at its outer end, said coil being connected to the rear end of the barrel, a reservoir having its discharge end connected to the barrel and supported thereon, a shield supported by the reservoir and enclosing the barrel and also enclosing the coil and at least the discharge end of the reservoir, a blow torch carried by the handle and arranged for feeding heated gases to the rear end of the shield, individual valves for the discharge end of the reservoir and for the nozzle of the barrel, a single trigger operating means for both of the valves, and an air tube connecting the first named tube to the upper portion of the reservoir.

EUGENE H. MILLER.

REFERENCES CITED

The following references are of record in the file of this patent:

UNITED STATES PATENTS

| Number | Name | Date |
|---|---|---|
| 1,262,134 | Stolle | Apr. 9, 1918 |
| 1,880,331 | Rapp | Oct. 4, 1932 |
| 2,225,168 | Forton | Dec. 17, 1940 |
| 2,252,942 | Mourer | Apr. 19, 1941 |

FOREIGN PATENTS

| Number | Country | Date |
|---|---|---|
| 505,023 | Great Britain | May 3, 1939 |